(12) United States Patent
Featherstone

(10) Patent No.: US 10,364,871 B2
(45) Date of Patent: Jul. 30, 2019

(54) LINEAR DRIVE MECHANISM OF THE SCREW AND NUT TYPE WITH PERFECT ROLLING CONTACT

(71) Applicant: FONDAZIONE ISTITUTO ITALIANO DI TECNOLOGIA, Genoa (IT)

(72) Inventor: Roy Featherstone, Genoa (IT)

(73) Assignee: FONDAZIONE ISTITUTO ITALIANO DI TECHNOLOGIA, Genoa (IT)

( * ) Notice: Subject to any disclaimer, the term of this patent is extended or adjusted under 35 U.S.C. 154(b) by 79 days.

(21) Appl. No.: 15/573,517

(22) PCT Filed: May 12, 2016

(86) PCT No.: PCT/IB2016/052739
§ 371 (c)(1),
(2) Date: Nov. 13, 2017

(87) PCT Pub. No.: WO2016/181341
PCT Pub. Date: Nov. 17, 2016

(65) Prior Publication Data
US 2018/0149246 A1    May 31, 2018

(30) Foreign Application Priority Data
May 14, 2015    (IT) .................. 102015000015088

(51) Int. Cl.
*F16H 25/22*    (2006.01)
(52) U.S. Cl.
CPC .............................. *F16H 25/2295* (2013.01)

(58) Field of Classification Search
CPC ............... F16H 25/229; F16H 25/2285; F16H 25/2295; F16H 2025/2271; F16H 25/24
See application file for complete search history.

(56) References Cited

U.S. PATENT DOCUMENTS 3,590,644 A * 7/1971 Kuspert ............... F16H 25/2295
                                                              74/427
4,856,356 A * 8/1989 Gartner ............... F16H 25/2295
                                                              74/25
(Continued)

FOREIGN PATENT DOCUMENTS

| EP | 0122596 A1 | 10/1984 |
| EP | 0896917 A1 | 2/1999 |
| GB | 790487 A | 2/1958 |

*Primary Examiner* — Zakaria Elahmadi
(74) *Attorney, Agent, or Firm* — Arent Fox LLP; Michael Fainberg

(57) ABSTRACT

The mechanism includes a threaded shaft extending along a longitudinal axis; a nut arranged coaxially with the threaded shaft; a plurality of rolling bearings interposed between the threaded shaft and the nut, each of the bearings comprising an outer race fixed to the nut, an inner race which is arranged coaxially with the outer race and is rotatable relative to the outer race about an axis of rotation, and a plurality of rolling members interposed between the outer race and the inner race; and a corresponding plurality of rings, each of which is fixed to the inner race of a respective bearing so as to rotate therewith about the same axis of rotation, and is interposed between the inner race of the bearing and the threaded shaft in such a manner that an inner surface of the ring is in contact with a screw thread of the threaded shaft.

9 Claims, 6 Drawing Sheets

(56) References Cited

U.S. PATENT DOCUMENTS

| | | | | |
|---|---|---|---|---|
| 5,636,549 A | * | 6/1997 | Devenyi | F16B 33/02 411/411 |
| 5,704,249 A | * | 1/1998 | Krauska | A47C 20/042 403/366 |
| 6,244,125 B1 | * | 6/2001 | Sano | B62D 5/0445 180/443 |
| 2015/0323050 A1 | * | 11/2015 | Ohno | F16H 25/20 74/434 |

* cited by examiner

LINEAR DRIVE MECHANISM OF THE SCREW AND NUT TYPE WITH PERFECT ROLLING CONTACT

CROSS-REFERENCE TO RELATED APPLICATIONS

This application is the U.S. National Stage Application of International Patent Application No. PCT/IB2016/052739, filed on May 12, 2016, which claims priority to Italian Patent Application No. 102015000015088, filed on May 14, 2015, the contents of each of which is incorporated herein by reference in its entirety.

TECHNICAL FIELD

The present invention relates to a linear drive mechanism comprising a threaded shaft extending along a longitudinal axis and a nut arranged coaxially with the threaded shaft, wherein the threaded shaft and the nut are movable relative to each other along the longitudinal axis as a result of relative rotation of the threaded shaft with respect to the nut about the longitudinal axis.

BACKGROUND

The latest generation of brushless electric motors have recently become available, and are characterized by having a specific power, that is to say a power-to-weight ratio, which is significantly higher than that of earlier electric motors. It would therefore be desirable to use these motors also in robotic applications. However, these motors run at much higher speeds than those that can be withstood by the recirculating ball screws normally used in robotics, and therefore it has been impossible to use the full potential of these new motors hitherto. Consequently, there is a need to provide a linear drive device which is able to operate at much higher speeds than those permitted by recirculating ball screws. There are existing alternative solutions with better performances than recirculating ball screws, such as roller screws or rolling ring screws, but these suffer from a number of drawbacks. Roller screws are very costly because of the complex shape of their components. The currently known rolling ring screws have at least one of the two following drawbacks: the contact between the threaded shaft and the rolling rings is a point contact, which limits the transmissible force, and the relative movement of the threaded shaft with respect to the rolling rings is not a perfect rolling movement but has a degree of slip, thus increasing the frictional losses and consequently reducing the mechanical efficiency. Examples of rolling ring screws are known from U.S. Pat. Nos. 4,856,356 and 6,244,125.

A linear drive mechanism according to the preamble of independent claim 1 is known from EP 0 122 596.

SUMMARY

It is an object of the present invention to provide a linear drive mechanism of the screw and nut type which is able to operate at much higher rotational speeds than those currently permitted by recirculating ball screws, which has higher mechanical efficiency, and which is able to transmit greater forces, than the prior art discussed above.

This and other objects are fully achieved according to the present invention by means of a drive mechanism having the characteristics specified in the attached independent claim 1.

Advantageous embodiments of the present invention are described in the dependent claims, the content of which is to be considered as an integral and integrating part of the following description.

In short, the invention is based on the idea of arranging the rings in such a manner that their axes of rotation are both inclined at a certain angle and positioned at a certain distance with respect to the longitudinal axis of the threaded shaft, and of shaping the screw thread of the threaded shaft and the inner surfaces of the rings in such a manner that each ring is in perfect rolling contact with the threaded shaft along a contact line which is fixed relative to the nut. Since rings mounted on rolling bearings are used, in place of balls moving along a helical path with a recirculating channel connecting the two ends of the path, since the rings are in perfect rolling contact with the threaded shaft, and since the contact between the rings and the threaded shaft is a linear contact instead of a point contact, the linear drive mechanism according to the invention can operate at much higher rotational speeds than those permitted by the usual recirculating ball screws, while also having lower frictional losses, and therefore higher mechanical efficiency than the prior art, and it can also transmit higher forces (for the same contact area) than the prior art. Moreover, the linear drive mechanism according to the invention is simpler and less expensive to produce than roller screws.

BRIEF DESCRIPTION OF THE DRAWINGS

Further characteristics and advantages of the present invention will be fully apparent from the following detailed description, which is given purely by way of non-limiting example with reference to the attached drawings, where.

DETAILED DESCRIPTION

Figure 1:
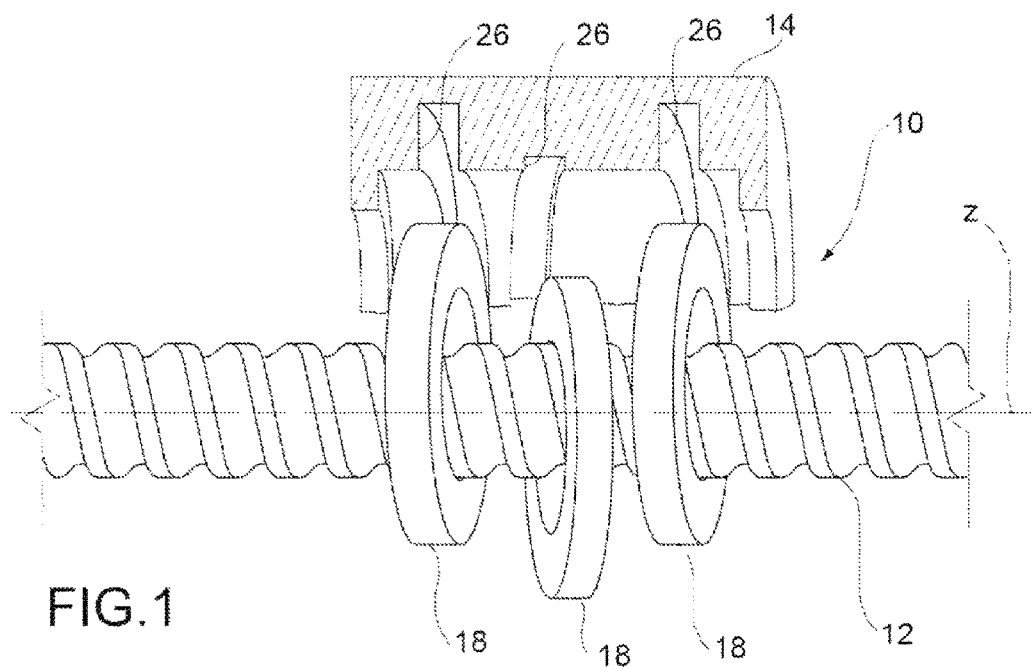
FIG. 1 shows a linear drive mechanism according to an embodiment of the present invention.
Figure 2:
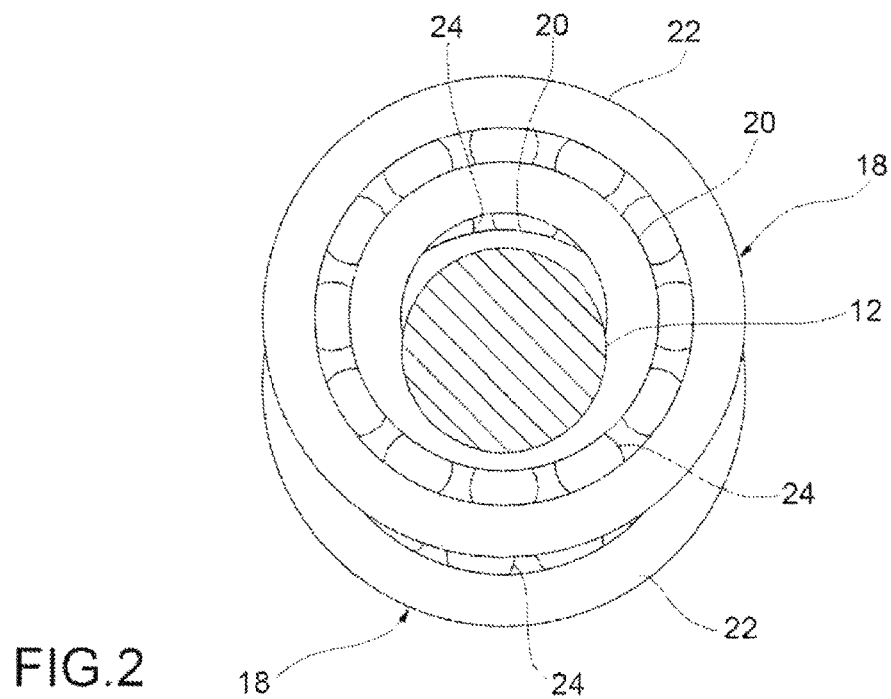
FIG. 2 is a schematic front view of the linear drive mechanism of FIG. 1.

With reference first to FIG. 1, a linear drive mechanism (hereinafter simply referred to as "mechanism") is generally indicated 10 and comprises a threaded shaft 12 extending along a longitudinal axis z and a nut 14 arranged coaxially with the threaded shaft 12. The mechanism 10 is configured to cause a relative linear movement of the threaded shaft 12 with respect to the nut 14 along the longitudinal axis z as a result of a relative rotational movement of the threaded shaft 12 with respect to the nut 14 about the longitudinal axis z. Typically, the nut 14 is rotationally locked, but is freely shiftable along the longitudinal axis z, while the threaded shaft 12 is translationally locked but freely rotatable about the longitudinal axis z, whereby rotation of the screw 12 about the longitudinal axis z causes translation of the nut 14 along the longitudinal axis z. Alternatively, the nut 14 is mounted so that it can only rotate about the longitudinal axis z, but cannot shift along this axis, while the screw 12 is mounted so that it can only shift along the longitudinal axis z, but cannot rotate about this axis, whereby rotation of the nut 14 about the longitudinal axis z causes translation of the screw 12 along the longitudinal axis z.

Figure 3:
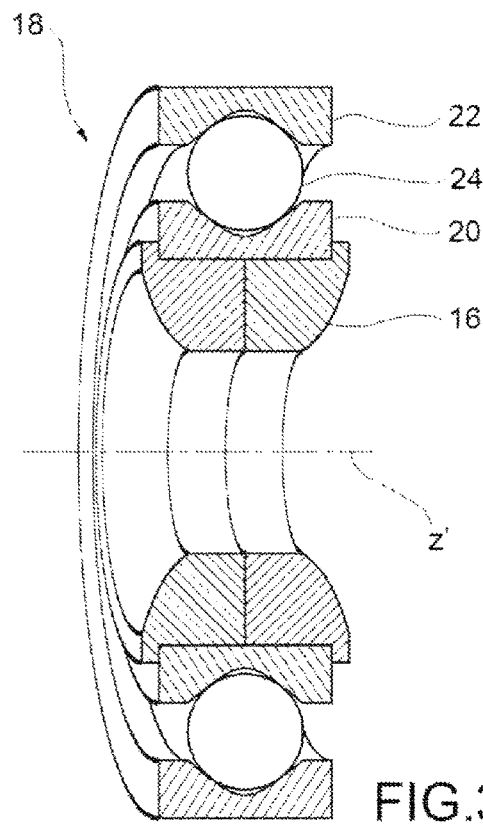
FIGS. 3 and 4 are axial section views of two possible embodiments of the bearing and ring assembly of the linear drive mechanism of FIG. 1.
Figure 4:
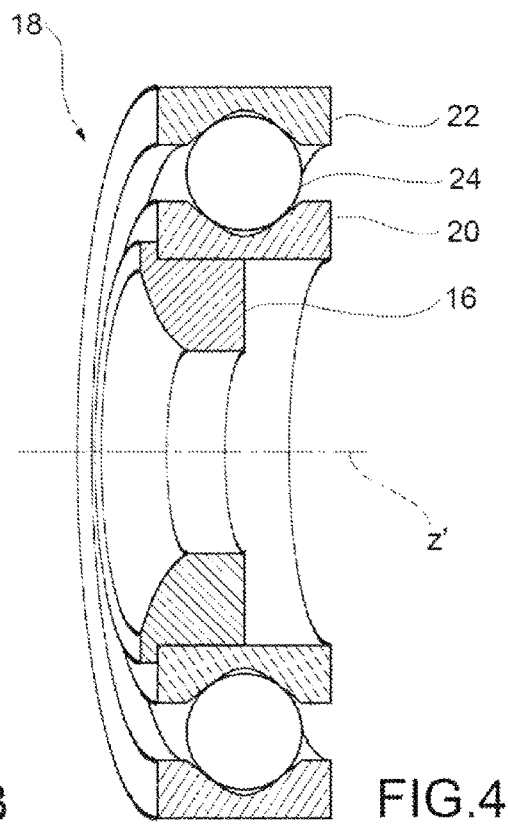

The mechanism 10 further comprises a plurality of rings 16 which engage with the screw thread of the threaded shaft 12. In the embodiment shown in the drawings, the mechanism comprises three rings 16, but more rings may be provided. Each ring 16 is received in the nut 14 with a corresponding rolling bearing 18 (hereinafter simply referred to as "bearing") arranged in between. The bearing 18 is shown as a ball bearing in the drawings, but might also be a bearing having other types of rolling elements, for example rollers. Each bearing 18 comprises, in a per-se-known manner, an inner race 20, an outer race 22 and a plurality of rolling elements 24 (made as balls in the illustrated example). The inner race 20 is fixed to the respective ring 16, while the outer race 22 is fixed to the nut 14. The inner race 20 may be made in one piece with the ring 16, in which case the ring 16 forms a portion of the inner race 20. Alternatively, as shown in FIGS. 3 and 4, the ring 16 may be made as a separate piece from the race 20, and may be firmly attached thereto, by welding or by a force-fit, for example. In this second case, the ring 16 may be made in two pieces (FIG. 3), typically two identical pieces, although it is not essential for the pieces to be identical, in order to be able to exchange axial forces with the threaded shaft 12 in both directions. According to the embodiment of FIG. 4, however, the ring 16 is formed as a single piece, which is separate from the inner race 20 of the bearing 18, and is shaped so as to exchange axial forces with the threaded shaft 12 in only one direction.

In the embodiment of FIG. 1, the nut 14 is made in two halves (of which only the upper half is shown) firmly joined to one another, and has a plurality of seats 26, each of which is adapted to receive a respective bearing 18. The seats 26 are suitably positioned relative to the longitudinal axis z in such a manner that the axis of rotation z' of each bearing 18, and therefore of each ring 16, is positioned at a given distance and with a given inclination with respect to the longitudinal axis z, this distance and inclination being the same for all the rings. Thus, when the two halves of the nut 14 are joined together, with the bearings 18 housed in their respective seats 26, the bearings are locked in the nut, the correct positioning of each bearing being ensured by the respective seat.

Figure 5:
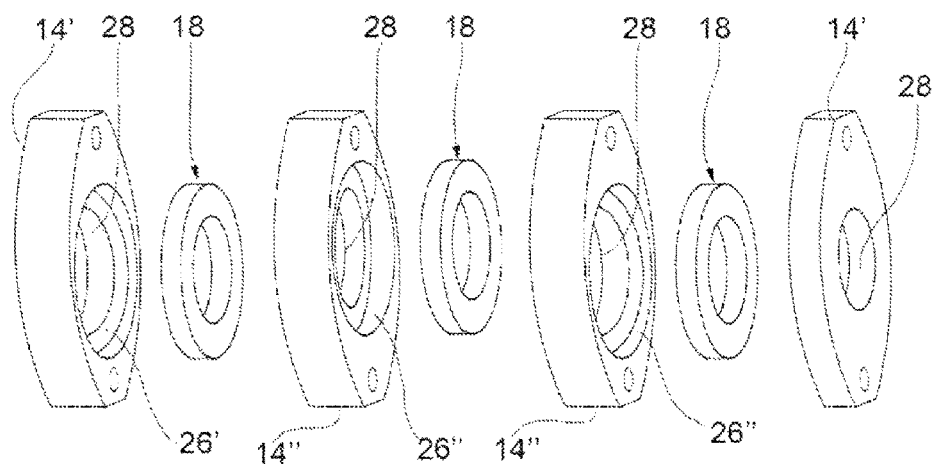
FIG. 5 is an exploded view which shows a variant embodiment of the nut of a linear drive mechanism according to the invention.

An alternative embodiment of the nut 14 is shown in FIG. 5. According to this alternative embodiment, the nut 14 comprises a stack of nut elements 14' and 14", which are arranged in contact with one another along the longitudinal axis z and are held together by a pair of pins (not shown). Each nut element 14', 14" has a central hole 28 through which the threaded shaft 12 can pass, and a recess 26', 26" for housing the bearings 18. More precisely, each of the end nut elements, indicated 14', has a recess 26' only on its side facing axially towards the inside of the nut, while each of the intermediate nut elements, indicated 14", has recesses 26" on both of its sides. Thus, when the nut elements 14', 14" are joined together, each bearing 18 is locked in the seat formed by the recesses of two adjacent nut elements. Clearly, the recesses 26', 26" are positioned, orientated and shaped so as to lock the bearings 18, when the nut 14 is assembled, in the correct position and with the correct orientation.

As stated above, the axis of rotation z' of each ring 16 is positioned at a given distance and with a given inclination with respect to the longitudinal axis z. Additionally, the inner surface (indicated 16a) of each ring 16 and the outer surface (indicated 12a) of the threaded shaft 12 are suitably shaped so as to provide not only a suitable positioning and orientation of the axes of rotation z' of the rings 16, but also a contact between the rings and the threaded shaft which, theoretically at least, is a perfect rolling contact, which is present along a line rather than at a single point. The way in which the axes of rotation z' of the rings 16 are positioned and orientated with respect to the longitudinal axis z, as well as the way in which the inner surface of each ring and the outer surface of the threaded shaft are shaped in order to provide the aforesaid condition of perfect rolling, will now be described with reference to FIGS. 6 to 12.

Figure 6:
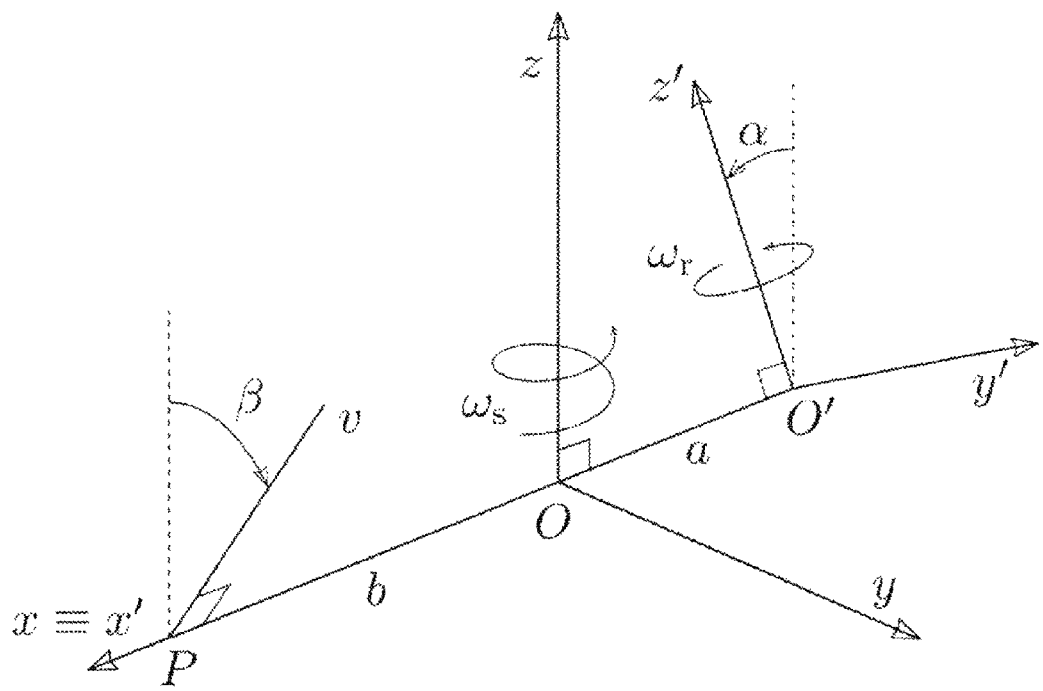
FIG. 6 shows the relative arrangement of the axis of a threaded shaft and the axis of a ring such that perfect rolling contact between the ring and the threaded shaft is ensured.

FIG. 6 shows the longitudinal axis z of the threaded shaft 12 and the axis of symmetry z' of one of the rings 16 of the mechanism 10. The only axis which is perpendicular to both axis z and axis z' is indicated x. The point of intersection between the axes x and z is indicated O, and a first Cartesian reference system xyz is positioned at this point. Likewise, the point of intersection between the axes x and z' is indicated O', and a second Cartesian reference system x'y'z' is positioned at this point, the axis x' of which coincides with the axis x of the xyz reference system. The point O' identifies the geometrical centre of the ring 16. The relative position of the ring 16 with respect to the threaded shaft 12 is defined by a distance a, equal to the distance between the points O and O', and by an angle of inclination α, measured about the axis x in the direction shown in the figure.

If $\omega_s$ denotes the angular velocity of the threaded shaft 12 and h denotes the pitch of the screw thread of the threaded shaft (measured in lead per radian), then the linear velocity $v_s$ of a generic point with coordinates x, y and z moving jointly with the threaded shaft is given by the equation:

$$v_s(x, y, z) = \omega_s \begin{bmatrix} -y \\ x \\ h \end{bmatrix} \quad (1)$$

Likewise, if $\omega_r$ denotes the angular velocity of the ring 16, then the linear velocity $v_r$ of a generic point with coordinates x, y and z moving jointly with the ring is given by the equation:

$$v_r(x, y, z) = \omega_r \begin{bmatrix} -\sin(\alpha)z - \cos(\alpha)y \\ \cos(\alpha)(x + a) \\ \sin(\alpha)(x + a) \end{bmatrix} \quad (2)$$

The equations (1) and (2) show that there is a single line in space, in particular a straight line, at each point of which the condition of identity between the linear velocity $v_s$ and the linear velocity $v_r$ is satisfied at that point. This line, indicated v in FIG. 6, intersects the axis x at a point indicated P, the distance of which from the point O is indicated b. The line v is perpendicular to the axis x and is inclined at an angle β to the axis z, the angle β being measured about the axis x in the direction indicated in the figure (opposite to the direction in which the angle α is measured).

The four parameters a, α, b and β are linked by the following two equations:

$$\tan(\alpha) = \frac{h}{b} \quad (3)$$

$$\tan(\beta) = \frac{h}{a} \quad (4)$$

From equations (3) and (4) it follows that each ring 16 must have the same values of a and α, that is to say its axis of rotation z' must be located at the same distance and with the same inclination with respect to the longitudinal axis z of the threaded shaft 12.

The following relation also derives from the condition of equality between the linear velocities $v_s$ and $v_r$:

$$\frac{\omega_r}{\omega_s} = \frac{\sqrt{h^2 + b^2}}{a + b} \quad (5)$$

Figure 7:
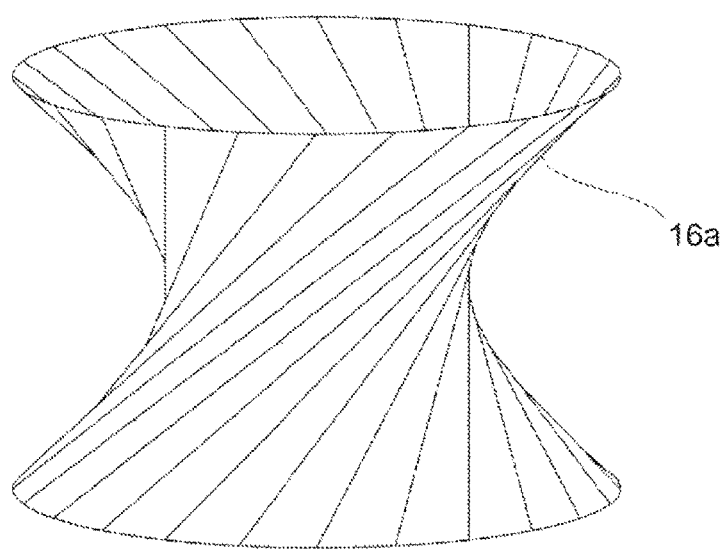
FIGS. 7 and 8 show the shape of the inner surface of the ring and the shape of the outer surface of the threaded shaft, respectively, which shapes are such that perfect rolling contact between the ring and the threaded shaft is ensured.
Figure 8:
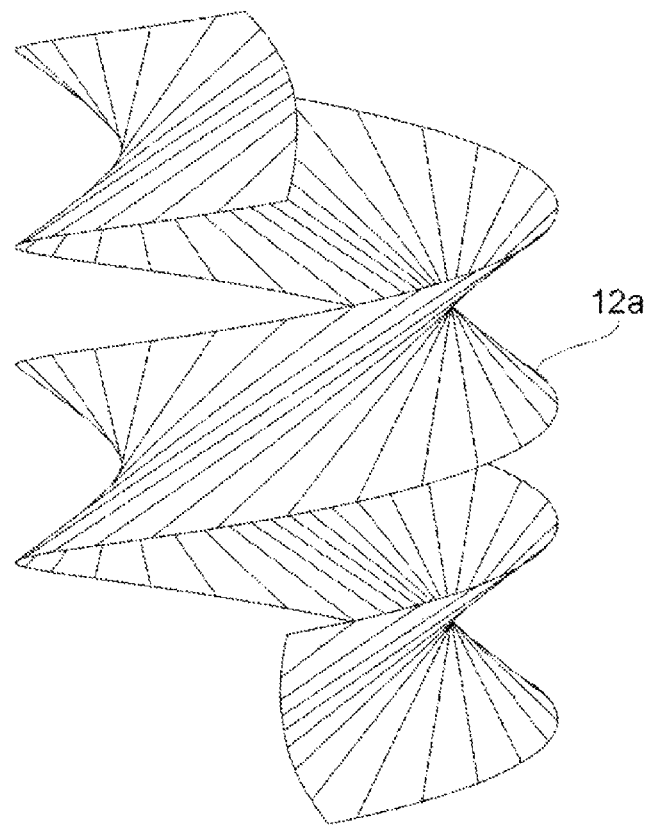

The shape of the inner surface 16a of each ring 16 is found on the basis of the following consideration. Given that the ring 16 rotates about the axis of rotation z' and is also constantly in contact with the threaded shaft 12 along the line v, the inner surface 16a of the ring 16 is the surface of revolution obtained by making the line v, which is located at a distance a+b from the axis of rotation z' of the ring, rotate about this axis. The surface obtained in this way is a hyperboloid of one sheet, as shown in FIG. 7. This surface is described by the following equation:

$$x'^2 + y'^2 (a+b)^2 + \tan(\alpha+\beta)^2 z'^2, \quad (6)$$

where x', y' and z' are the coordinates referred to the reference system x'y'z' with its centre at the point O', a+b is the minimum radius of the hyperboloid, and α+β is the angle of inclination of the line v with respect to the axis of rotation z' of the ring 16.

From equation (6) it follows that the parameters a, b, α and β must satisfy the relation $$ab > h^2, \quad (7)$$

and therefore $$\alpha + \beta < 90°. \quad (7')$$

It also follows from equation (6) that the inner surfaces 16a of the rings 16 must all have the same shape.

The shape of the outer surface 12a of the threaded shaft 12, that is to say the shape of the screw thread of the threaded shaft 12, is found by applying a reasoning similar to that provided above for the inner surface of the ring 16. The outer surface 12a is therefore the surface of revolution obtained by making the line v move about the longitudinal axis z of the threaded shaft 12 along a helical path with radius b and pitch h. The surface obtained in this way (see FIG. 8) has no official name, and will be identified hereafter as a helical hyperboloid.

Figure 9:
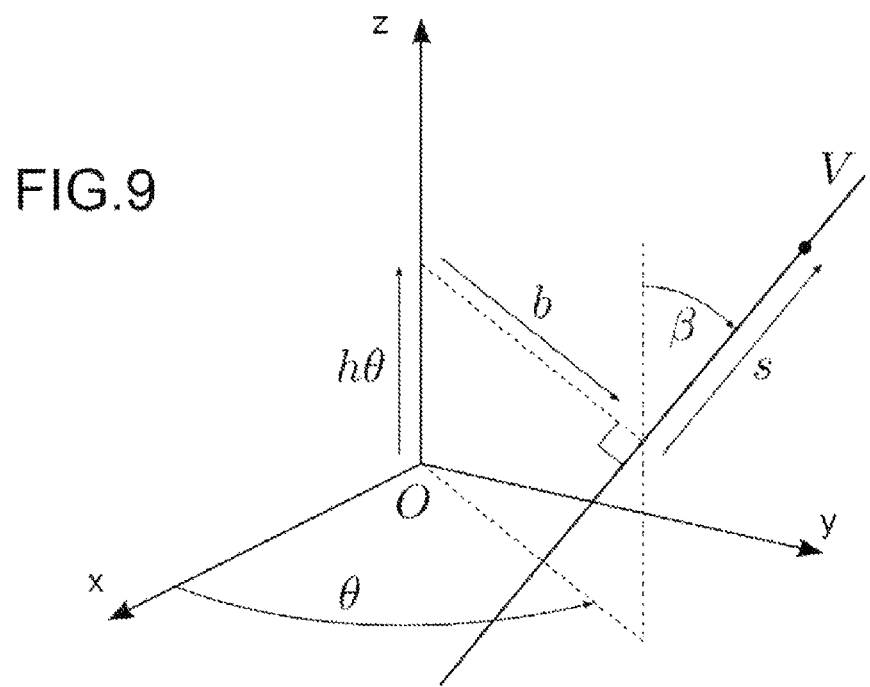
FIG. 9 shows how the shape of the outer surface of the threaded shaft of FIG. 8 can be obtained.
Figure 11:
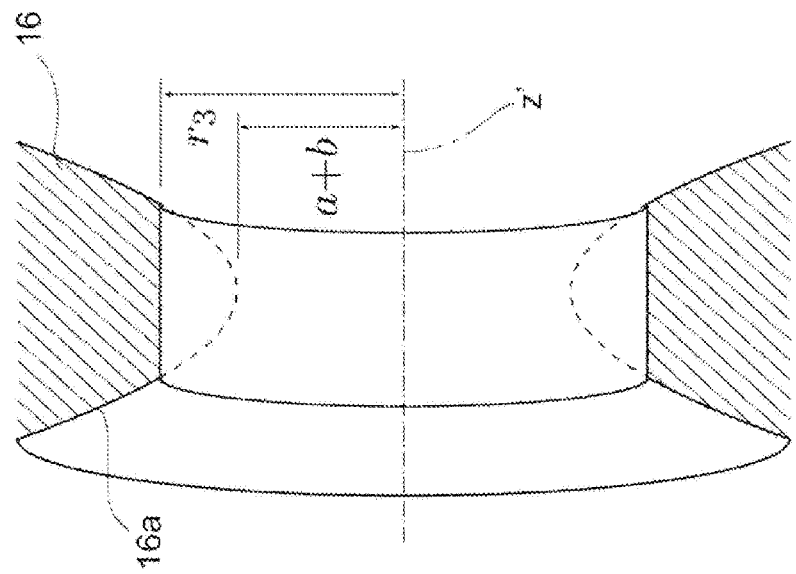
FIGS. 10 and 11 are axial section views of a portion of the threaded shaft and of one of the rings of the linear drive mechanism of FIG. 1.
Figure 10:
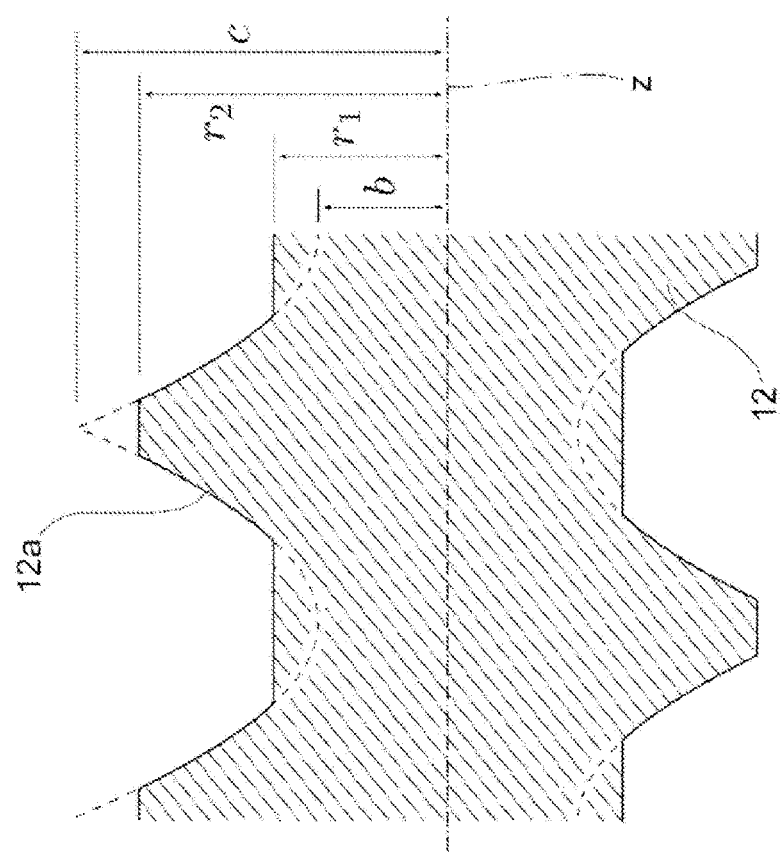
Figure 12:
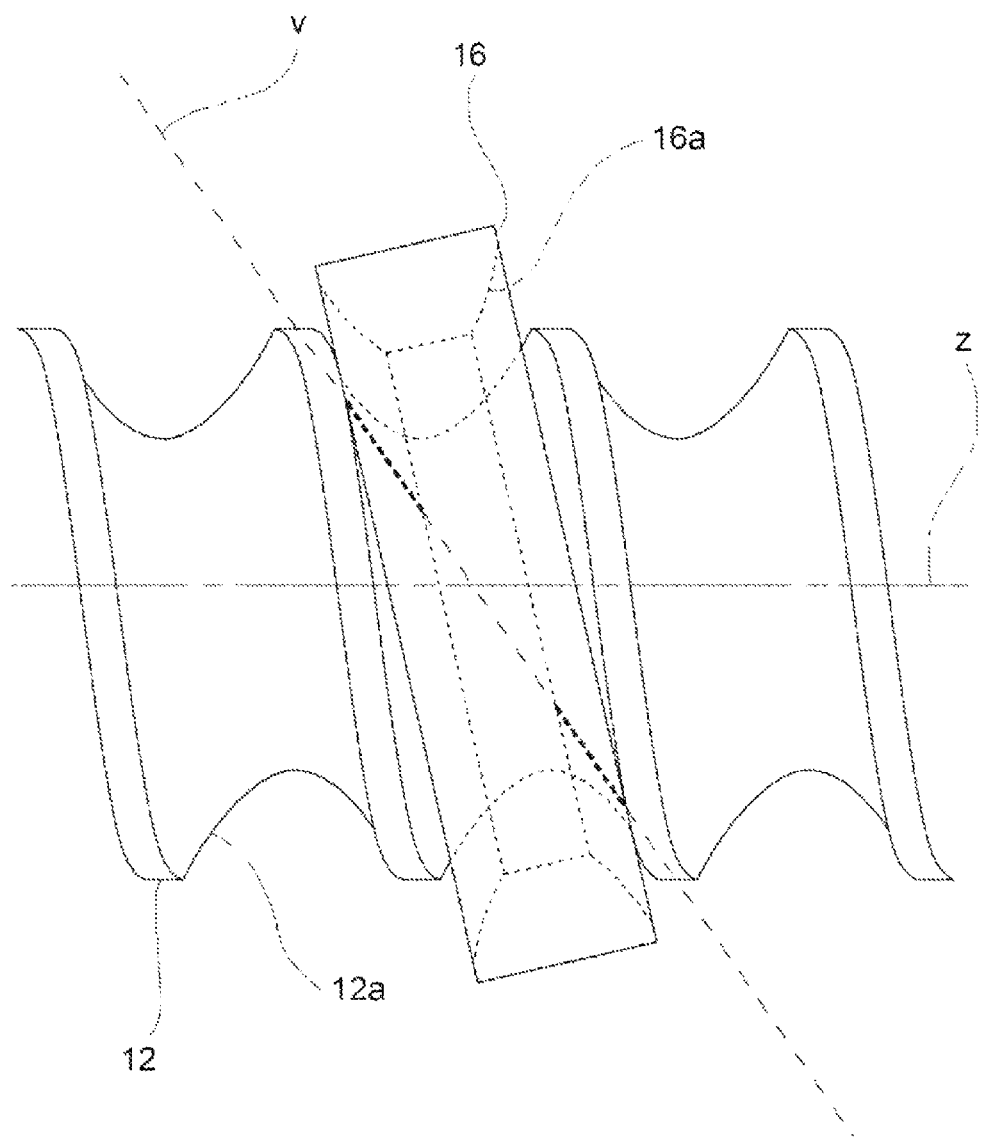
FIG. 12 shows a portion of the threaded shaft of the linear drive mechanism of FIG. 1, with one of the rings mounted on the shaft, and shows in particular the two contact segments between the threaded shaft and this ring.

This surface is described, in the coordinate system xyz, by the following equation:

$$x = b \cos(\theta) - s \sin(\beta)\sin(\theta)$$

$$y = b \sin(\theta) + s \sin(\beta)\cos(\theta)$$

$$z = h\theta + s \cos(\beta) \quad (8)$$

where θ indicates the angle of rotation of the line v about the axis z and s indicates the position of a point along the line v, as shown in FIG. 9. The axial section views of FIGS. 10 and 11 show, respectively, the profile of the screw thread of the threaded shaft 12 and the profile of the inner surface 16a of the ring 16, found as described above. Finally, FIG. 12 shows the relative positioning of one of the rings 16 with respect to the threaded shaft 12, and, in particular, it shows the two contact segments, along the line v, between the ring 16 and the threaded shaft 12.

Further characteristics of the invention can be seen in these figures.

Firstly, the inner surface 16a (the contact surface) of the ring 16 has a thickness smaller than the width of the groove of the screw thread of the threaded shaft 12.

Additionally, the angle of inclination of the ring 16, that is to say the angle α between the axis of rotation z' of the ring and the longitudinal axis z of the threaded shaft 12, is greater than the helix angle of the screw thread on the outer diameter of the threaded shaft 12.

As shown in FIG. 10, the shape of the screw thread of the threaded shaft 12 is defined by the values of the aforementioned parameters h, b and β, as well as by the values of the parameters $r_1$ and $r_2$, which represent the inner radius (that is to say, the radius at the root of the screw thread) and the outer radius (that is to say, the radius at the crest of the screw thread) of the threaded shaft, respectively. The inner radius $r_1$ must be equal to or greater than b (the minimum radius of the helical hyperboloid defining the outer surface of the threaded shaft 12). Naturally, an increase in $r_1$ involves an increase in the rigidity of the threaded shaft 12, and therefore in the resonance frequency thereof, but the weight of the threaded also increases. The outer radius $r_2$ must be equal to or smaller than the maximum radius (which is indicated c in FIG. 10 and can be calculated from the values of the parameters h, b and β) of the helical hyperboloid; clearly, it must also be greater than the inner radius $r_1$. A high value of $r_2$, that is to say, a value close to c, is preferable.

With reference to FIG. 11, the shape of the inner surface 16a of the ring 16 is determined not only by the aforementioned parameters a+b and α+β, but also by the inner radius $r_3$ of the ring. As this figure clearly shows, it is preferable for the innermost portion of the hyperboloid shape of the inner surface 16a of the ring 16 to be removed, and consequently for the inner radius $r_3$ of the ring to be greater than the theoretical value a+b obtained from equation (6). This portion, in fact, cannot transmit high axial forces; furthermore, its presence limits the designer's freedom in defining the parameters a, b, α, β and h without encountering problems of interference between the ring and the threaded shaft. Consequently, as shown in FIG. 12, the contact between the threaded shaft 12 and each of the rings 16 takes place not along a single segment, but along two segments lying on the same line (the contact line v). The sum of the lengths of these two segments is smaller than the length of the single contact segment which would be found if the inner surface of the ring was shaped as a perfect, non-truncated hyperboloid.

As stated above, all the rings 16 must have the same distance a, the same angle of inclination α and the same hyperboloid shape of the inner surface. The rings 16 are positioned at different points along the threaded shaft 12, with an arrangement such that the threaded shaft is forced to move with respect to the nut with a screwing movement. The minimum number of rings 16 is three, as in the embodiment shown herein, but additional rings might obviously be provided. In fact, the larger the number of rings, the higher the axial force that can be transmitted by the mechanism. In the embodiment shown in FIG. 1, the three rings 16 are positioned in such a way that their centres and the longitudinal axis z of the threaded shaft 12 lie in the same plane. However, this arrangement is not essential.

As is evident from the description provided above, the linear drive mechanism of the present invention provides a perfect rolling contact which is not a point contact, but a linear contact, between the threaded shaft and the rings, and can therefore transmit higher axial forces than the prior art. Additionally, because of the use of rolling bearings in place of recirculating balls, the linear drive mechanism of the present invention can operate at higher speeds and with greater efficiency than the prior art.

Naturally, the principle of the invention remaining unchanged, the embodiments and details of construction may vary widely from those described and illustrated purely by way of non-limiting example, without thereby departing from the scope of the invention as defined in the attached claims.

The invention claimed is:

1. Linear drive mechanism comprising a threaded shaft extending along a longitudinal axis and a nut arranged coaxially with the threaded shaft, the threaded shaft and the nut being shifted relative to each other along the longitudinal axis (z) as a result of relative rotation of the threaded shaft with respect to the nut about the longitudinal axis, wherein the mechanism further comprises a plurality of rolling bearings interposed between the threaded shaft and the nut, each of the bearings comprising an outer race fixed to the nut, an inner race which is arranged coaxially with the outer race and is rotatable relative to the outer race about an axis of rotation, and a plurality of rolling members interposed between the outer race and the inner race, and a corresponding plurality of rings, each of which is fixed to the inner race of a respective bearing so as to rotate therewith about the same axis of rotation and is interposed between the inner race of the bearing and the threaded shaft in such a manner that an inner surface of the ring is in contact with a screw thread of the threaded shaft, wherein the rings and the bearings are arranged in such a manner that their respective axes of rotation are both inclined by a first angle and positioned at a first distance with respect to the longitudinal axis of the threaded shaft, said first angle and said first distance being the same for all the rings, and wherein the shape of the screw thread of the threaded shaft and the shape of the inner surface of each ring are configured in such a manner that each ring is in perfect rolling contact with the threaded shaft along a respective contact line that is fixed relative to the nut and is both inclined by a second angle and positioned at a second distance with respect to the longitudinal axis of the threaded shaft, characterized in that said first angle, said first distance, said second angle and said second distance are linked by the following equations:

$\tan = h/b$ $\tan = h/a,$ where h is the pitch of the screw thread measured in lead per radian.

2. Mechanism according to claim 1, wherein the inner surfaces of the rings have, at least in a portion thereof that during operation is in contact with the threaded shaft, the same shape of a hyperboloid of one sheet, and wherein the screw thread of the threaded shaft has, at least in portions thereof that during operation are in contact with the rings, a helical hyperboloid shape.

3. Mechanism according to claim 1, comprising at least three bearings and three rings.

4. Mechanism according to claim 1, wherein said first angle is greater than the helix angle of the screw thread of the threaded shaft at the outer diameter of the latter.

5. Mechanism according to claim 1, wherein the thickness of the inner surface of each ring is smaller than the width, measured at the outer diameter of the threaded shaft, of the helical groove defined by the screw thread of the threaded shaft.

6. Mechanism according to claim 1, wherein the bearings are ball bearings.

7. Mechanism according to claim 1, wherein the rings are made in one piece with the inner races of the respective bearings.

8. Mechanism according to claim 1, wherein the rings are made as separate pieces from the inner races of the respective bearings.

9. Mechanism according to claim 1, wherein the nut has a corresponding plurality of seats, each adapted to receive a respective bearing, said seats being positioned and orientated relative to the nut in such a manner that the axes of rotation of the bearings, and hence of the rings, are inclined by said first angle and positioned at said first distance with respect to the longitudinal axis.

* * * * *